(12) United States Patent
Suzuki et al.

(10) Patent No.: US 6,299,196 B1
(45) Date of Patent: *Oct. 9, 2001

(54) AIR BAG APPARATUS

(75) Inventors: Kazumasa Suzuki, Ogaki; Kazumi Ichimaru; Yasushi Okada, both of Ichinomiya; Yuji Kuriyama, Seki, all of (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,607

(22) Filed: Mar. 19, 1999

(51) Int. Cl.$^7$ .................................................. B60R 21/16
(52) U.S. Cl. ..................................... 280/728.2; 280/728.3
(58) Field of Search ............................. 280/728.2, 728.3, 280/732

(56) References Cited

U.S. PATENT DOCUMENTS

| 5,445,409 | * | 8/1995 | Abramczyk et al. | 280/728.2 |
| 5,474,323 | * | 12/1995 | Davidson | 280/728.1 |
| 5,490,689 | * | 2/1996 | Garner et al. | 280/728.2 |

FOREIGN PATENT DOCUMENTS

| 08310329 A | 11/1996 | (JP) . |
| 09132099 A | 5/1997 | (JP) . |

\* cited by examiner

Primary Examiner—Paul N. Dickson
Assistant Examiner—Faye M. Fleming
(74) Attorney, Agent, or Firm—Pillsbury Winthrop LLP (57) ABSTRACT

The invention is an air bag apparatus in which an air bag module comprises a cover member, and a main body holding an inflator and a folded air bag. The cover includes depending side walls and at least a pair of coupling bars caused to integrate the cover member and to the main body. The arrangement eliminates the need for riveting a cover member to the main body and reduces the number of steps required in an assembly operation.

The cover member includes a pair of attaching leg portions that are fitted to the outer side of the main body. The attaching leg portions each includes a plurality of engaging holes. The main body includes a plurality of engaging projections corresponding to the engaging holes. Each of the engaging projections includes a lock hole, opened at least to a lower side, and disposed on the outer side of the attaching leg portion of the cover member when the engaging projection is fitted to the engaging hole. Each of the coupling bars includes a fixed seat portion. The fixed seat portions of the coupling bars are brought into contact with the main body, and fixedly fastened together along with the air bag.

10 Claims, 5 Drawing Sheets

AIR BAG APPARATUS

BACKGROUND OF THE INVENTION

1. Field of the Invention

The present invention relates to an air bag apparatus in which an air bag module, including an inflator and a folded air bag, are contained in a case comprised of a main body and a cover. The main body can have a square shape and a pair of coupling bars to integrate and hold the cover member to the main body.

The air bag is applicable to use with passengers, for a steering wheel, for a side door, for a seat back or at other desirable locations in an automobile.

2. Description of Related Art

A conventional air bag apparatus, for example, includes an air bag module with an inflator and an air bag is integrally contained in a case, with the case being constituted to integrally couple together a cover member and a case.

Further, normally when integrally coupling the main body and the cover member, leg portions formed on a lower face of the cover member are brought into contact with outer side faces of the main body, and are fastened together by rivets at a plurality of portions. Riveting is carried out mainly for the reason of strength.

However, when riveting a number of separate parts (rivets, rivet seats and so on) are needed, and a number of steps of riveting are required.

3. Summary of the Invention

It is an object of the invention to provide an air bag apparatus capable of eliminating rivets when a cover member is fixedly coupled to a main body of a case to enclose an air bag module.

According to an aspect of the invention, there is provided an air bag apparatus having a configuration in which an air bag module substantially including an inflator and an air bag is integrally contained in a case, and the case includes a cover member, a main body, and a pair of coupling bars for coupling the cover member to the main body.

The cover member includes attaching leg portions, having a wall-like shape, fitted to outer sides of the main body at a lower face of the cover member on at least two sides thereof, and the attaching leg portions each includes a plurality of engaging holes.

The main body includes a plurality of engaging projections corresponding with the engaging holes at side walls of the main body. Each of the engaging projections includes a lock hole opened at least to a lower side, and disposed on an outer side of the attaching leg portion of the cover member when the engaging projection is fitted to the engaging hole.

The coupling bar includes a fixed seat portion having a plate-like shape and a plurality of lock pieces extending from the fixed seat portion in an upward direction and corresponding with the size and location of the lock holes.

The fixed seat portions of the coupling bars are brought into contact with the main body, and fixedly fastened together along with the air bag. The lock pieces are inserted from a lower side into the lock holes of the engaging projections by which the attaching leg portions of the cover member are fixedly coupled to both side walls of the main body.

In the above-described configuration, it is preferable that the lock holes be of a penetration type, and that the lock pieces be provided with a length projected to the upper side of the lock holes. It is also preferable that the lock pieces be provided with a length overlapping an upper edge of the engaging holes of the cover member.

Further, the lock pieces can be constituted to provide a stopper piece that is locked to the engaging hole of the cover member on a lower side thereof.

By the above-described configuration, in coupling the cover member with the main body, the coupling bars which are fixed by using both retainers and fastening bolts are utilized; accordingly, in connecting the cover member with the main body, rivets can be eliminated. In comparison with the conventional case in which the cover member and the main body are coupled by the rivets, the number of parts (rivets and rivet seats) required is reduced. Further, the riveting operation, requiring a number of steps, is dispensed with, thereby further reducing the number of manufacturing steps.

DESCRIPTION OF THE PREFERRED EMBODIMENTS

Although an explanation will be provided as follows of one exemplary embodiment of the invention, by using an example of an air bag apparatus for a passenger seat, the invention is not limited to this disclosed embodiment.

As shown in FIGS. 1–5, the air bag apparatus is configured under the premise that an air bag module, including an inflator 12 and an air bag 14, is integrally contained in a case 16. The case 16 is installed with a cover member 18, a main body 20 having a square cylinder or rectangular shape, and a pair of coupling bars 22 for integrally coupling together both members the cover member 18 and the main body 20.

The main body 20 is normally shaped to hold an inflator unit 24, so that it is smaller disposed on the lower side, and a bag holding unit 26, which is larger than the inflator unit 24 and disposed on the upper side. Both are coupled together at a stepped portion 28. A bag attaching seat plate 32 has a square ring shape is fixed onto the stepped portion 28 by welding and is bentcurved upwardly along the top of the inflator 12.

As another example of the main body, an the inflator holding unit and a bag holding unit may be formed with the same width.

Further, the cylindrical inflator 12 has a lock flange portion 12a at a rear end thereof. The inflator 12 is inserted from an opening 24a into the inflator holding unit 24, so that an end bolt 12b of the inflator 12 projects from the opposite closed wall 24b and is fastened into place by a nut 34, with the flange portion 12a engaged with a peripheral edge of the opening 24a.

The air bag 14 is attached with a ring retainer 30 located at an inner peripheral edge of an opening leading to inflator 12. The air bag is folded and has an outer winding shape in the vertical direction, and a bellows shape in horizontal direction. The air bag 14 is fixed to the bag attaching seat plate 32 such as by riveting and/or by screws not illustrated. Further, the inner side of the ring retainer 30 formed to act as is a diffuser face 40 that includes a plurality of holes for guiding the flow of gas from the inflator 12 into air bag 14.

Cover member 18 is normally molded by injection molding from plastic, for example a polyolefin thermoplastic elastomers (TPEs), polystyrene TPEs or polyester based TPEs. The main body 20 is formed by drawing metal such as steel sheet.

According to the preferred embodiment, in the above—described configuration, cover member 18, main body 20, and the pair of coupling bars 22 are, respectively, formed as follows.

Figure 1:
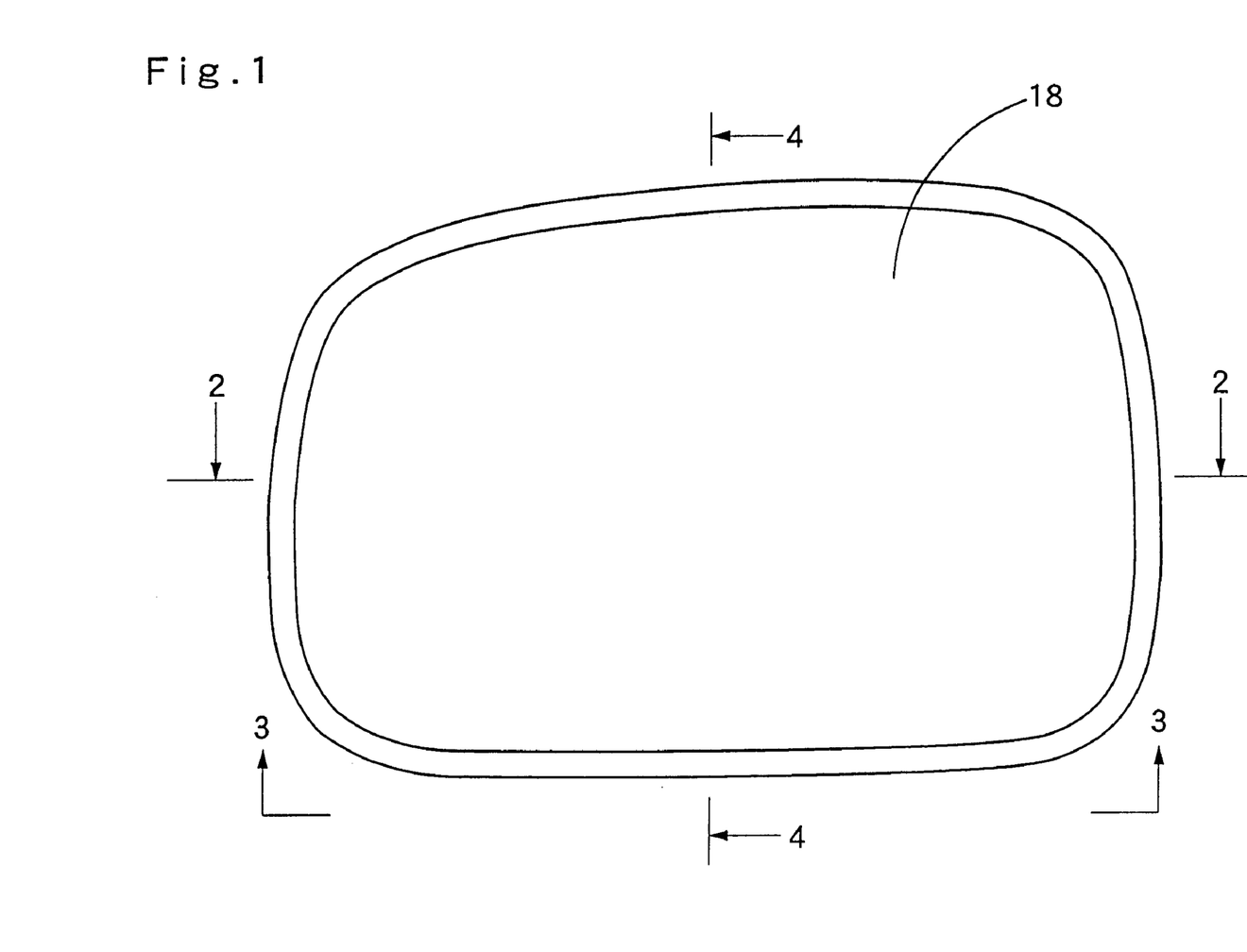
FIG. 1 is a top-plan outline view of an air bag apparatus according to the invention.
Figure 2:
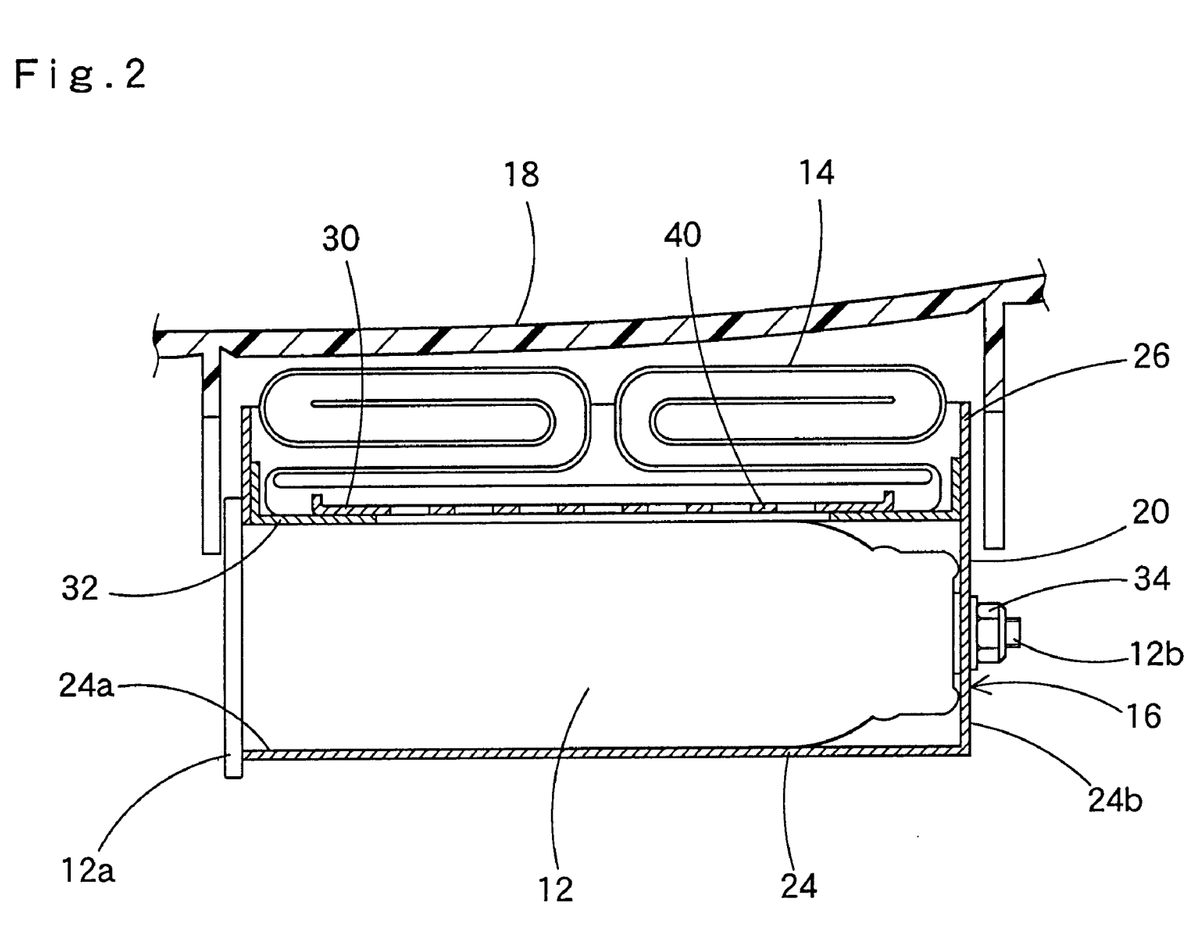
FIG. 2 is a cross-sectional view taken along a line 2—2 of FIG. 1.

The cover member 18 is provided with mounting or attaching leg portions 42 that have a wall-like shape designed to fit with the outer sides of the main body 20, and in particular to the outer sides of the bag holding unit 26 adjacent the lower face of at least opposite sides of the cover member 18. Each of the attaching leg portions 42 is installed with a plurality of engaging holes 44 that extend in a horizontal direction along the side of the cover. According to the illustrated example, the attaching leg portions 42 are formed in each of the four sides of the bag holding unit 26. Although five of the engaging holes 44 are provided on one side as shown in FIG. 1, the number may be modified to a lesser number, such as two, or increased to six or more. Although the shape of the engaging hole 44 is shown as square, it may have other shapes, such as rhomboidal, circular or elliptic. Further, the engaging holes 44 are normally formed simultaneously with molding of the cover member 18, thereby reducing the production steps. However, when fabricating a plurality of covers, in which only the shape or the number of the engaging holes differ, and the other shapes remain the same, the engaging holes may be formed by machining after the molding operation. This is because the mold can be used in common.

Figure 4:
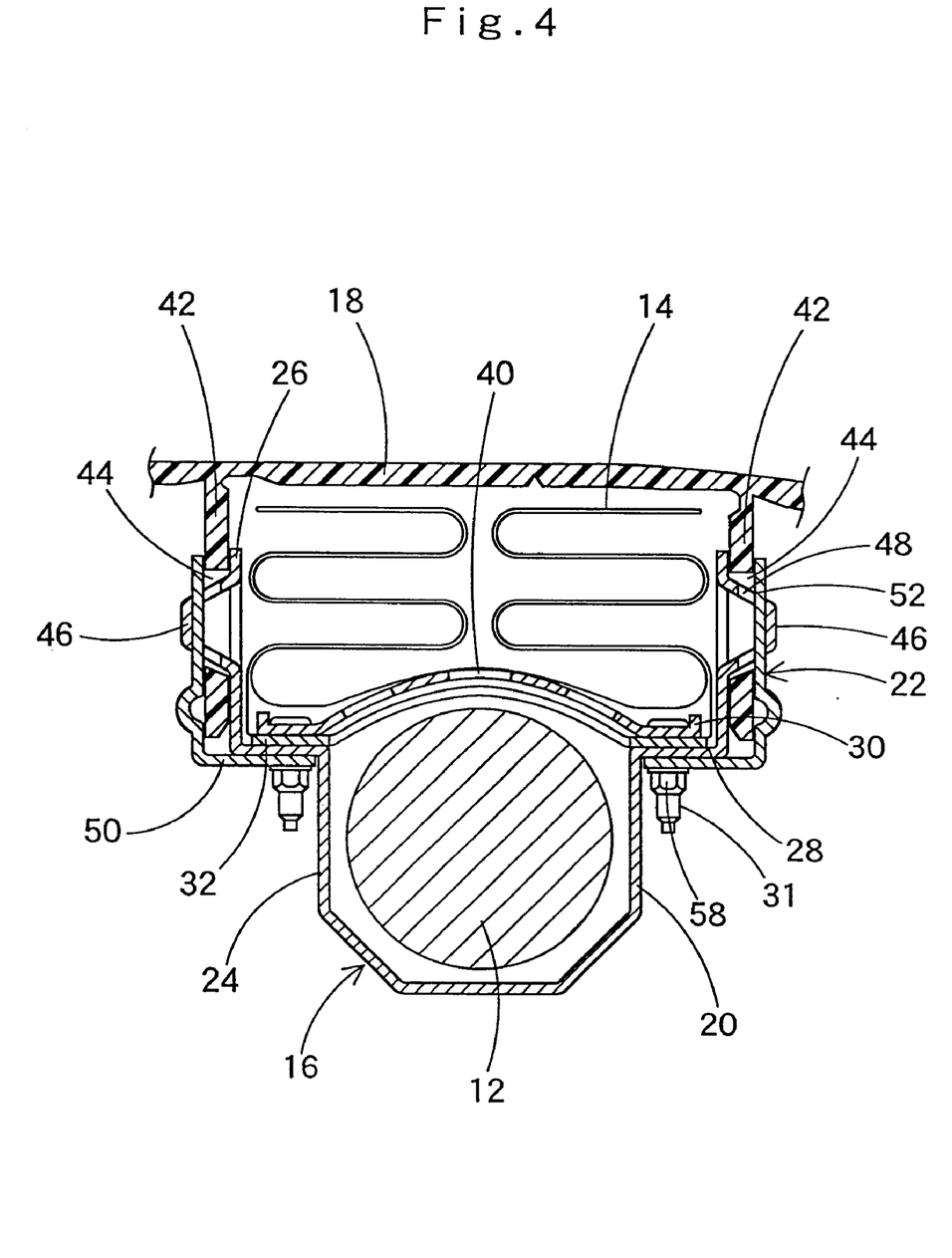
FIG. 4 is a cross-sectional view taken view taken along a line 4—4 of FIG. 1.
Figure 5:
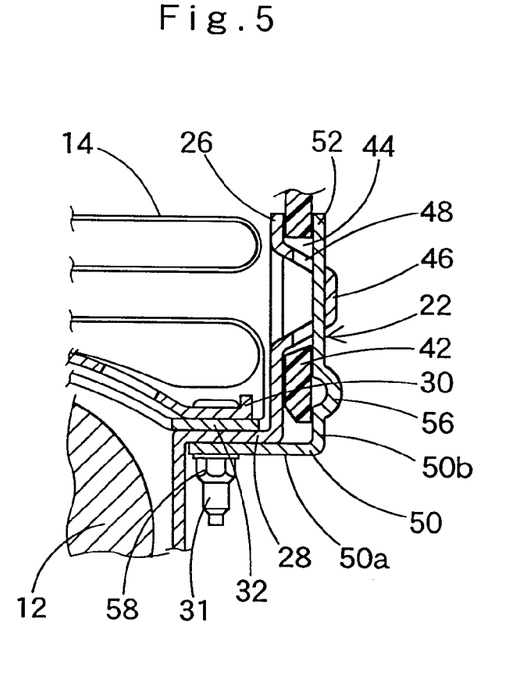
FIG. 5 is an enlarged portion end view of FIG. 4.
Figure 6:
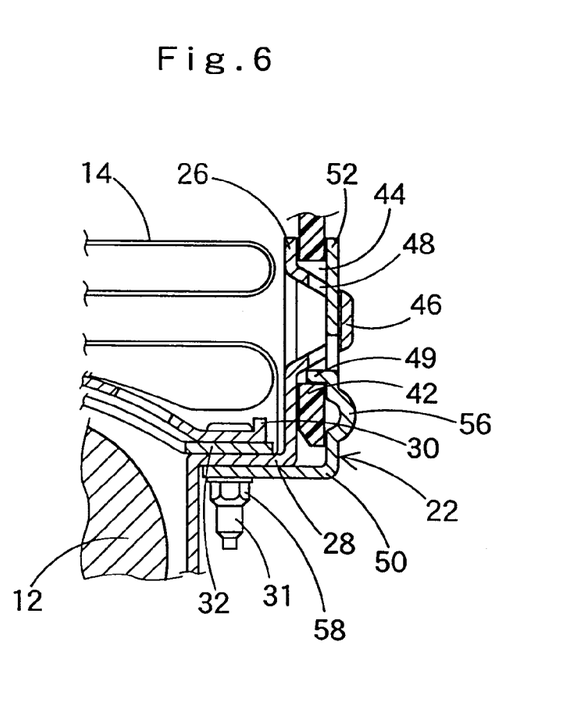
FIG. 6 is an enlarged view similar to FIG. 5 showing another embodiment of the present invention.

The upper side wall portion of the main body 20, in the area of the bag holding unit 26, includes a plurality of engaging projections 46 corresponding to the number and location of the engaging holes 44. The engaging projections 46 are provided with lock holes 48 disposed outside of the attaching leg portions 42 of the cover member 18 when the engaging projections 46 fit into the engaging holes 44 open at least toward the lower side. Although in the illustrated example, a lock hole 48 is formed to penetrate in the up and down direction, it may be opened only at its lower side. Further, the sectional shape of the engaging projections 46 maybe trapezoidal or semicircular as illustrated in FIGS. 4, 5 and 6. This is in view of making it easy to form the engaging projection 46, and of facilitating the absorption of a dimensional dispersion caused between the positions of the engaging hole 44 and the engaging projection 46 relative to each other in the up and down direction. Other examples of the sectional shape of an engaging projection (not shown in Figs.)may be triangular or square.

The engaging projection 46 is normally formed by forming (pulling up) the portion after punching through the lock hole 48. Further, when the thickness of the attaching leg portion 42 is large and the lock hole 48 cannot be disposed outside of the attaching leg portion 42 merely by a pulling up operation, the engaging projection 46 could be formed separately may be formed by and fixing it by welding or other securing techniques.

Each of the coupling bars 22 is provided with a fixed seat plate-like portion 50 in a plate-like shape and a plurality of upwardly directed lock pieces 52 extended, that is, projected from and connected to the fixed seat portion 50. in correspondence with the lock holes 48. The fixed seat portion 50 of the coupling bar 22 is brought into contact with a wall face of the main body 20, and is fixedly fastened together along with the air bag 14. In the illustrated example, the fixed seat portion 50 is in an angle-like cross-sectional shape formed by a horizontal portion 50a and a vertical portion 50b. The horizontal portion thereof is brought into contact with the lower side of the stepped portion 28 of the main body 20; and is fastened together by nuts 58 via bolts 31 (at three locations on one side) projected from the bag retainer 30. In the illustrated example, the vertical portion 50b thereof is installed with a horizontally extending reinforcement rib 56, which is shaped by forming. This is done to enhance the rigidity of the fixed seat portion 50 and the lock piece 52 of the coupling bar 22. Further, the coupling bars 22 may not necessarily be formed as separate bodies, but rather may be integrated by a connecting plate which is brought into contact with both end walls of the main body 22. In the embodiment shown in FIG. 1, five of the respective lock pieces, 52 are used to correspond with the five engaging projections 46.

Figure 3:
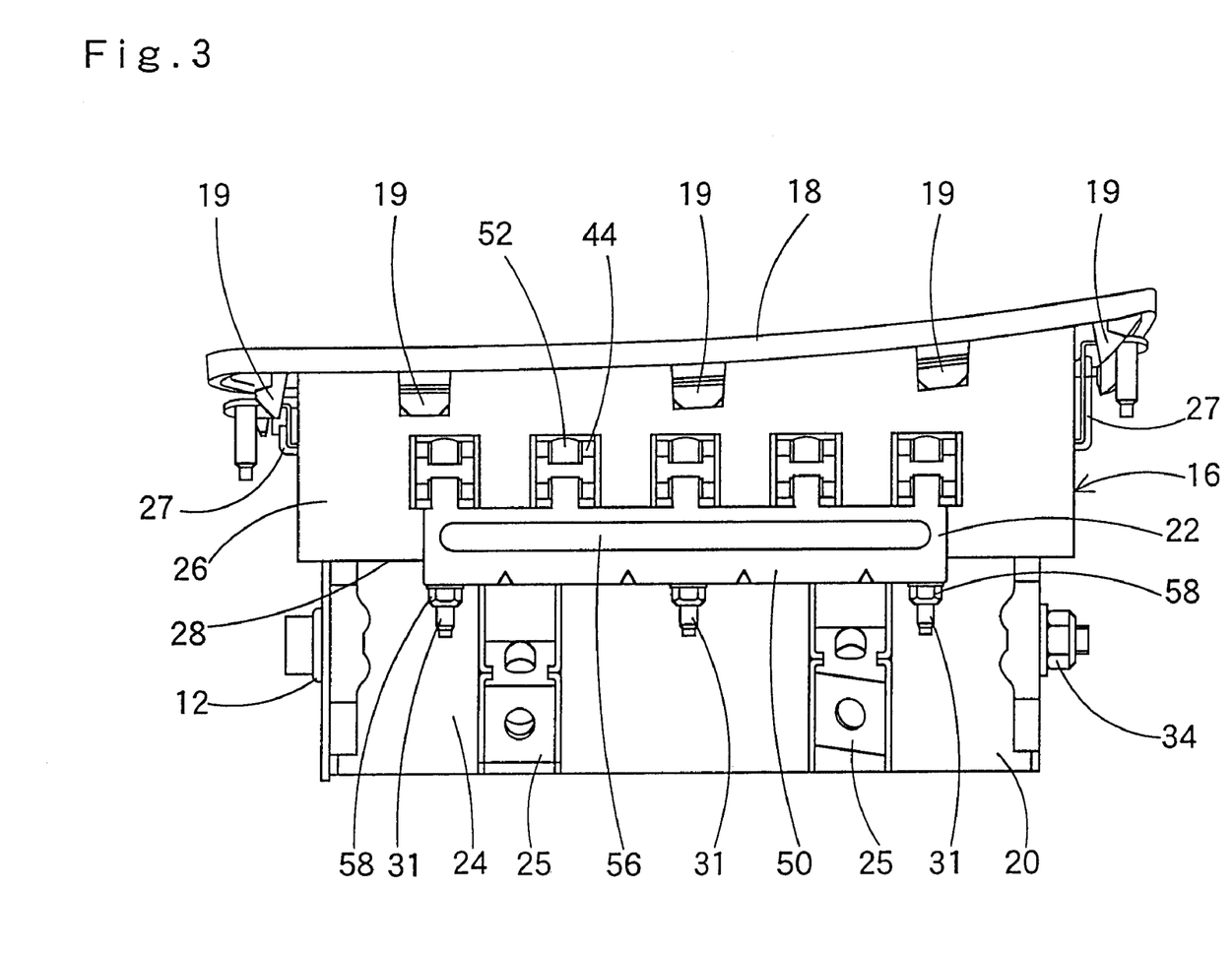
FIG. 3 is a vertical side elevation view taken along a line 3—3 of FIG. 1.

Lock pieces 52 are inserted or slid into the position shown in FIGS. 3–5 up along the cover side walls and from the lower side into and through the lock holes 48 of the engaging projections 46. The attaching leg portions 42 of the cover member 18 are, in the illustrated example, fixed to both side walls in the longitudinal direction of the upper portion of the main body 20, adjacent to the bag holding unit 26. That is, by inserting the lock pieces 52 into the lock holes 48, so as to overlay the outer sides of the attaching leg portions 42, the attaching leg portions 42 of the cover member 18 are retained between the side walls of the bag holding unit 26 and the coupling bars 22, specifically the locking pieces 52. This locks the side of the cover member 16 to the wall faces of the bag holding unit 26, including in an immovable up and down direction and in the left and right direction.

In this case, in the illustrated example, not only the lock hole 48 is of a penetration type, but also the lock piece 52 is provided with a length that extends to the upper side of the lock hole. With such a configuration, the presence or absence of firm engagement of the lock pieces 52 to the lock holes 48 can easily be visually recognized. Further, in the illustrated example, the lock piece 52 is provided with a length by which a portion thereof overlaps an upper edge of the engaging hole 44 of the cover member 18. Therefore, in operating or deploying the air bag, even when the lock piece 52 is engaged with the upper edge of the engaging hole 44, and a force that is equal to or more than a set valve is applied to the cover member 18, detachment of the cover member can be prevented.

It is also possible to restrain even a small amount of upward movement of the cover member 18, as shown by FIG. 6, by modifying a portion of the lock piece 52 to include stopper piece 49 on its lower end side from locking to the engaging hole 44 of the cover member 18. This stopper piece 49 is bent or overlays the top edge of the cover within the holes 44, as is shown in FIG. 6.

Next, an explanation will be provided for the assembling operation of the air bag 15 apparatus in the above-described embodiment.

First, the cover member 18 is inverted, and the main body 20, containing the air bag module M, is pushed in until the respective engaging projections 46 of the main body 20 are engaged with the engaging holes 44 of the cover member 18.

That is, the respective engaging projections 46 will fit into holes 44 while causing a bulge of both side walls of the cover member 18 in the longitudinal direction from the inner side to the outer side, and this also locates and positions lock holes 48. Specifically, the lock holes 48 become disposed on the outer side of the cover member 18. The bolts 31 of the bag retainer 30 are brought into a state in which they project from the stepped portion 28 of the main body 20.

The lock pieces 52 of the respective coupling bars 22 are then moved along the respective side walls of the cover member 18 in the longitudinal direction. The lock pieces 52 are inserted into and through the lock holes 48, and the fixed seat portions 50 of the respective coupling bars 22 also overlap the stepped portion 28 of the main body 20. By inserting the lock pieces 52 into the lock holes 48 disposed on the outer side of the attaching leg portions 42, the attaching leg portions 42 of the cover member 18 are immovably locked to the wall faces of the bag holding unit.

The bolts 31 of the retainer 30 are then fastened into place by nuts 58 and the assembling of the air bag apparatus is completed.

Although not illustrated in the FIGS., the air bag apparatus assembled in this way is connected to vehicle body at an integration portion of an instrument panel via brackets 25 and brackets 27 having bolts, respectively, projecting from the inflator holding unit 24 and the bag holding unit 26 of the main body 20. In this case, locking leg portions 19 formed on the lower face of the cover member 18 are engaged with receiving portions formed in an instrument panel, not illustrated, and the cover member 10 is flush therewith.

Further, in operating the air bag, although the cover member 18 will be pushed upwardly when it receives a force in the upward direction by expansion of the air bag 15, the upward movement of the cover member 18 is stopped by the collective effect of the engaging projections 46 and the lock pieces 52. Therefore, the cover member 18 is not elevated further, a door portion 18a of the cover member 18 is opened, and the air bag 14 can be successfully deployed.

As shown in FIG. 6, when portions for example, the second and fourth lock pieces of the five on one side, of the lock pieces 52 are provided with the stopper piece 49 locked to the engaging holes 44 of the cover member 18 on their lower end sides, the amount of cover movement is small. The stopper piece 49 can be formed by cutting to move a central portion of the lock piece 52.

Further, although the cover member 18 simultaneously bulges to the side when the air bag deploys, the lock pieces 52 are not normally detached from the lock holes 48, since the lock pieces 52 are inserted into and through the lock holes 48. Further, when the lock pieces 52 are constituted to provide a length that overlaps the upper edges of the engaging holes 44, the side walls of the cover member 18 are effectively restrained from bulging. Therefore, even when a force which is equal to or more than a set value is exerted, the lock pieces 52 can be securely prevented from detaching from the lock holes 48.

The foregoing detailed description of the preferred embodiment of this invention has been provided for the purposes of illustration and description. It is not intended to be exhaustive or to limit the invention to the precise embodiment disclosed. Other modifications and variations may be evident to practitioners in the art when considered in reference to this disclosure.

What is claimed is:

1. A passenger air bag apparatus comprising:
   a case containing an inflator and a folded air bag,
   a cover having a top and at least opposing depending side walls,
   said case including a plurality of projections extending outwardly from at least two opposing side walls,
   said depending cover side walls including a plurality of openings formed therein corresponding in numbered position to said plurality of projections,
   a pair of coupling bars coupled to said case, and
   a plurality of lock pieces extending from said pair of coupling bars, each of said plurality of lock pieces being provided between said plurality of projections and said depending cover side walls to lock said depending cover side walls against said case.

2. The passenger air bag apparatus according to claim 1, wherein a portion of said lock piece includes a stopper piece portion locked to the plurality of openings of said cover on lower end sides thereof.

3. The passenger air bag apparatus according to claim 1, wherein each of said plurality of projections define a lock hole, and wherein said lock piece is of a penetration type provided with a length projected to an upper side of the lock hole.

4. The passenger air bag apparatus according to claim 3, wherein the portion of said lock piece includes a stopper piece portion locked to the plurality of openings of said cover on lower end sides.

5. The passenger air bag apparatus according to claim 1, wherein said lock piece is provided with a length overlapping an upper edge of the plurality of openings of said cover.

6. The passenger air bag apparatus according to claim 5, wherein a portion of said lock piece includes a stopper piece portion locked to the plurality of openings of said cover on lower end sides thereof.

7. The passenger air bag apparatus according to claim 1, wherein the coupling bars are directly coupled to the case.

8. The passenger air bag apparatus according to claim 7, wherein the case, the coupling bars, the air bag and an air bag retainer are coupled together.

9. The passenger air bag apparatus according to claim 8, wherein each of the plurality of projections include a lock hole, and wherein each lock piece is inserted into the lock hole in the same direction as the folded air bag employs.

10. The passenger air bag apparatus according to the claim 9, wherein each said lock piece is inserted through the lock hole and projected to an upper side thereof.

* * * * *

UNITED STATES PATENT AND TRADEMARK OFFICE
CERTIFICATE OF CORRECTION

| | | |
|---|---|---|
| PATENT NO. | : 6,299,196 B1 | Page 1 of 1 |
| DATED | : October 9, 2001 | |
| INVENTOR(S) | : Suzuki et al. | |

It is certified that error appears in the above-identified patent and that said Letters Patent is hereby corrected as shown below:

<u>Title page,</u>
After "(22) Filed: March 19, 1999" insert

-- [30]    Foreign Application Priority Data

March 20, 1998  [JP]    Japan……………………………..10-73026 --

Signed and Sealed this

Thirty-first Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 6,299,196 B1
DATED         : October 9, 2001
INVENTOR(S)   : Suzuki et al.

It is certified that error appears in the above-identified patent and that said Letters Patent is hereby corrected as shown below:

<u>Title page,</u>
After Item "[22] Filed: March 19, 1999" insert

-- [30]         Foreign Application Priority Data
March 20, 1998 [JP] …………………………….....10-72036 --

Signed and Sealed this

Twenty-ninth Day of April, 2003

JAMES E. ROGAN
*Director of the United States Patent and Trademark Office*